United States Patent [19]

Butler

[11] 4,264,540

[45] Apr. 28, 1981

[54] PRODUCTION OF NUCLEAR FUEL PELLETS

[75] Inventor: Gregg G. Butler, Kirkham, England

[73] Assignee: British Nuclear Fuels Limited, Cheshire, England

[21] Appl. No.: 37,104

[22] Filed: May 8, 1979

[30] Foreign Application Priority Data

May 15, 1978 [GB] United Kingdom ............... 19635/78

[51] Int. Cl.$^3$ .............................................. G21C 21/00
[52] U.S. Cl. ................................ 264/0.5; 252/301.1 R
[58] Field of Search ................. 264/0.5; 423/251, 252, 423/260, 261

[56] References Cited

U.S. PATENT DOCUMENTS

| | | | |
|---|---|---|---|
| 3,806,565 | 4/1974 | Langrod | 264/0.5 |
| 3,872,022 | 3/1975 | DeHollander et at. | 264/0.5 |
| 4,020,131 | 4/1977 | Teraday | 264/0.5 |

*Primary Examiner*—Leland A. Sebastian
*Attorney, Agent, or Firm*—Larson, Taylor and Hinds

[57] ABSTRACT

In the production of nuclear fuel pellets consisting essentially of oxides of uranium, or mixtures of these oxides with oxides of thorium or plutonium, by granulating the oxide powder, pressing the granulated powder into compacts and sintering the compacts, niobium pentoxide is added to the oxide power in sufficient quantity to encourage grain growth in the oxide compact during sintering and the sintering and other process parameters are adjusted so that no impurities are trapped in the sintering pellets which would prevent a high matrix density and grain size being obtained.

Adjustment and control of the oxygen potential of the sintering atmosphere is proposed.

5 Claims, No Drawings

540

PRODUCTION OF NUCLEAR FUEL PELLETS

BACKGROUND TO THE INVENTION

This invention relates to the production of nuclear fuel pellets.

Nuclear fuel pellets may be produced from powdered oxides of uranium, plutonium or thorium, or mixtures of these oxides, by granulation of the powders followed by pressing of the granules into compacts and sintering the compacts. Additives are often mixed with the oxide powders and for a variety of reasons for example, to control the porosity of the sintered pellets, to act as a binder for the compacts or to aid sintering. Additives may also be used to control grain size in the sintered pellets, particularly to increase it, and this is now considered desirable because it increases gas atom diffusion length and, hence, reduces gaseous fission product release from the fuel pellets during irradiation.

STATEMENT OF THE INVENTION

According to the invention in the production of nuclear fuel pellets consisting essentially of oxides of uranium, or mixtures of these oxides with oxides of thorium or plutonium, formed into compacts and sintered, niobium pentoxide is included in the oxide compact in sufficient quantity to encourage grain growth in the oxide compact during sintering, and the sintering and other process parameters are adjusted so that no impurities are trapped in the sintering pellets which would prevent a high matrix density and grain size being obtained.

Retention of some impurities, notably carbon, which form gaseous compounds on reacting within the pellets, leads to the development of porosity within the pellets which will prevent high matrix density being attained, reduces the grain size which is achievable and may lead to pellet fragmentation. Since niobium pentoxide as well as being a grain growth promoter also increases the sintering rate the time before closure of pores during sintering may be insufficient for impurity removal and although complete elimination of the impurity is not essential removal down to very low levels is desirable, say less than ten parts per million by weight. The sintering rate and the impurity removal process may be controlled by control of the sintering atmosphere, in particular the oxygen potential and the heating rate during sintering.

The level at which the oxygen potential of the sintering atmosphere is controlled may affect both matrix density and grain size, and also the reproducibility of results. The extent of the effect depends not only on the absolute oxygen potential but on the density of compacts before sintering, the size of the compacts and the heating rate during sintering, indicating an impurity trapping mechanism is operating.

It is an important effect of the addition of niobium pentoxide in accordance with the invention that it does not significantly increase the diffusion rate of the fission products, notably the gases, in the ceramic matrix of the fuel pellets. Such an increase would, of course, offset the advantage which can be achieved by larger grain sizes.

With hydrogen as the sintering atmosphere the oxygen potential may be supplied by water vapour or by carbon dioxide (which leads to the production of water vapour).

DESCRIPTION OF PREFERRED EXAMPLES

In typical experiments 0.5% by weight of ball-milled niobium pentoxide was blended with uranium dioxide powder and granulated with 0.2% by weight of zinc stearate as a lubricant before pressing into compacts of diameter 1.1 cm and sintering in moist hydrogen for 4 hours at 1700° C. The following results were obtained by addition of water vapour to provide the oxygen potential.

1. At low moisture contents of less than 1000 parts per million by volume (vpm) density increased with increasing moisture content from 95% theoretical density (TD) to 98.5% while grain size increased from 14–35 microns.

2. At moisture contents between 1000 and 20,000 vpm density remained fairly constant at approximately 98.5% TD while grain size increased to at least 60 microns. For example, with a moisture content of 15,000 vpm a grain size of 50 microns was obtained.

3. Moisture contents over about 20,000 vpm gave a progressive reduction in density (and a decrease in the reproducibility of the density results). A typical result at 25,000 vpm moisture was about 95% TD with a grain size of 80 microns.

A similar effect on grain size can be obtained by adding carbon dioxide instead of water to the hydrogen sintering atmosphere as the following results show

| vpm $CO_2$ | % TD | Grain size (microns) |
| --- | --- | --- |
| 1000 | 94.0 | 12 |
| 7500 | 98.5 | 42 |
| 15000 | 99.0 | 58 |

It was also found that the upper limit of moisture content varied with various parameters. High densities and large grain sizes could be obtained at higher moisture contents by (a) Reducing the density of the green (unsintered) compact say from 5.75 g/cm$^3$ to 5.2 g/cm$^3$ (b) Reducing the heating rate during sintering say from 300° C. per hour to 50° C. per hour.

From all the above results it follows that, if the presently desired grain size of about 40 microns is to be achieved by adding 0.5% by weight of niobium pentoxide to the nuclear fuel and using the practicable and economic sintering time and temperature of 4 hours at 1700° C., the moisture level in a hydrogen sintering atmosphere should be maintained between 1000 and 9000 vpm. For a most satisfactory microstructure, however, it is considered that the optimum value within this range is 5000–7000 vpm for a water in hydrogen atmosphere and that for a carbon dioxide in hydrogen atmosphere the optimum carbon dioxide content is 7000–8000 vpm.

Varying the quantity of niobium pentoxide added affects the results too. Fuel pellets have been made with additions of niobium pentoxide as low as 0.25% by weight. A grain size of 25 microns was easily produced on sintering for 4 hours at 1700° C. in a hydrogen atmosphere containing 6000 vpm water vapour. With an increase in the addition of niobium pentoxide to 0.35% by weight grain sizes in excess of 30 microns were produced under the same conditions. The optimum results were obtained at 1700° C. with additions of 0.5% by weight of niobium pentoxide. With an increase in sintering time or sintering temperature it is to be expected however that less niobium pentoxide will be required to produce a given grain size.

Controlled porosity may be introduced into the sintered pellets by the inclusion of a fugitive pore former in the compact, as described, for example in U.K. Pat. No. 1,461,263.

I claim:

1. The production of nuclear fuel pellets consisting essentially of oxides of uranium, or mixtures of these oxides with oxides of thorium or plutonium, formed into compacts and sintered wherein niobium pentoxide is included in the oxide compact in sufficient quantity to encourage grain growth in the oxide compact during sintering, and the sintering and other process parameters are adjusted so that no impurities are trapped in the sintering pellets which would prevent a high matrix density and grain size being obtained.

2. The production of nuclear fuel pellets as claimed in claim 1 wherein the compacts are sintered in an atmosphere having a controlled oxygen potential.

3. The production of nuclear fuel pellets as claimed in claim 2 wherein the atmosphere is hydrogen containing at least 1000 parts per million by volume and not more than 9000 parts per million by volume of water vapour or carbon dioxide.

4. The production of nuclear fuel pellets as claimed in claim 1 wherein the quantity of niobium pentoxide added is between 0.2% and 0.6% by weight of the weight of the oxide powder.

5. The production of nuclear fuel pellets as claimed in claim 4 characterised in that the quantity of niobium pentoxide added is between 0.3% and 0.5% by weight of the weight of the oxide powder.

* * * * *